US012725142B2

(12) United States Patent
Morgan et al.

(10) Patent No.: US 12,725,142 B2
(45) Date of Patent: Sep. 1, 2026

(54) INTEGRATION OF DISPARATE ITEM SCANNING FOR CHECKOUTS

(71) Applicant: NCR Voyix Corporation, Atlanta, GA (US)

(72) Inventors: Kip Oliver Morgan, Atlanta, GA (US); Gina Torcivia Bennett, Lawrenceville, GA (US); Jerry Steven Massey, Lawrenceville, GA (US); John Kennedy, Atlanta, GA (US); Julia Anne Ogilvy, Cumming, GA (US); Amit Acharya, Frisco, TX (US); Eric Xavier Schoch, McKinney, TX (US)

(73) Assignee: NCR Voyix Corporation, Atlanta, GA (US)

( * ) Notice: Subject to any disclaimer, the term of this patent is extended or adjusted under 35 U.S.C. 154(b) by 40 days.

(21) Appl. No.: 18/412,292

(22) Filed: Jan. 12, 2024

(65) Prior Publication Data

US 2025/0232278 A1 Jul. 17, 2025

(51) Int. Cl.
*G06Q 20/20* (2012.01)

(52) U.S. Cl.
CPC .................................. *G06Q 20/208* (2013.01)

(58) Field of Classification Search
CPC ............. G06Q 20/208; G06Q 20/3278; G07G 1/0045; G07G 1/0054; G07G 1/0063; G07G 1/009
See application file for complete search history.

(56) References Cited

U.S. PATENT DOCUMENTS 11,134,798 B1 * 10/2021 Yang ..................... G06F 3/0488
11,743,588 B1 * 8/2023 Shu ........................ H04N 7/147 348/169
2018/0276456 A1 9/2018 Miyagi
2019/0026718 A1 * 1/2019 Iizaka .................. G07G 1/0054
2019/0311167 A1 * 10/2019 Powell ................. G06K 7/1408
(Continued)

FOREIGN PATENT DOCUMENTS

GB 2569248 A * 6/2019 ......... G06Q 20/3278
WO WO-2013066910 A1 * 5/2013 ........... G06Q 20/385

OTHER PUBLICATIONS

Wu et al.: An Intelligent Self-Checkout System for Smart Retail, 2016, 2016 International Conference on System Science and Engineering (ICSSE), National Chi Nan University, Taiwan, Jul. 7-9, 2016, pp. 1-4 (Year: 2016).*
(Continued)

*Primary Examiner* — Bijendra K Shrestha
(74) *Attorney, Agent, or Firm* — Schwegman Lundberg & Woessner, P.A.

(57) ABSTRACT

A unified item recognition driver is presented. The driver manages a plurality of disparate item scanning capable peripheral devices of a transaction terminal and computer vision item recognition applications on behalf of a transaction manager of the terminal. The driver prioritizes item codes provided by the devices and applications to select a highest ranked item code for any given item of a transaction. The item codes are provided to the transaction manager of the terminal to complete the transaction. In an embodiment, the driver searches online to resolve an item code when the peripherals and applications fail to resolve the item code for any given item.

20 Claims, 5 Drawing Sheets

(56) References Cited

U.S. PATENT DOCUMENTS

| | | | | |
|---|---|---|---|---|
| 2019/0333039 | A1* | 10/2019 | Glaser | G06Q 20/202 |
| 2020/0320505 | A1 | 10/2020 | Crooks et al. | |
| 2021/0334480 | A1 | 10/2021 | Gururaja et al. | |
| 2021/0334871 | A1* | 10/2021 | Quinn | G06Q 30/0603 |
| 2022/0171972 | A1* | 6/2022 | Stankovic | G06V 10/25 |
| 2023/0095037 | A1* | 3/2023 | Slaughter | G06N 20/10<br>705/23 |
| 2023/0169577 | A1* | 6/2023 | Morgan | G06Q 30/06<br>705/27.2 |
| 2024/0005750 | A1* | 1/2024 | Schoch | G06Q 20/18 |

OTHER PUBLICATIONS

"European Application Serial No. 24223747.7, Extended European Search Report mailed Jun. 11, 2025", 8 pgs.

* cited by examiner

INTEGRATION OF DISPARATE ITEM SCANNING FOR CHECKOUTS

BACKGROUND

Selling items at point-of-sale (POS) systems is becoming more complicated. While barcodes and barcode scanners are ubiquitous, they are starting to show their age. Barcode scanning is slow, error prone, and leads to shrink at self-service terminals (SSTs). Furthermore, many retailers want a fully customized front-end without the complexities of integrating peripheral devices. Consequently, new selling technologies arise faster than the retailers can keep up.

DETAILED DESCRIPTION

Figure 1A:
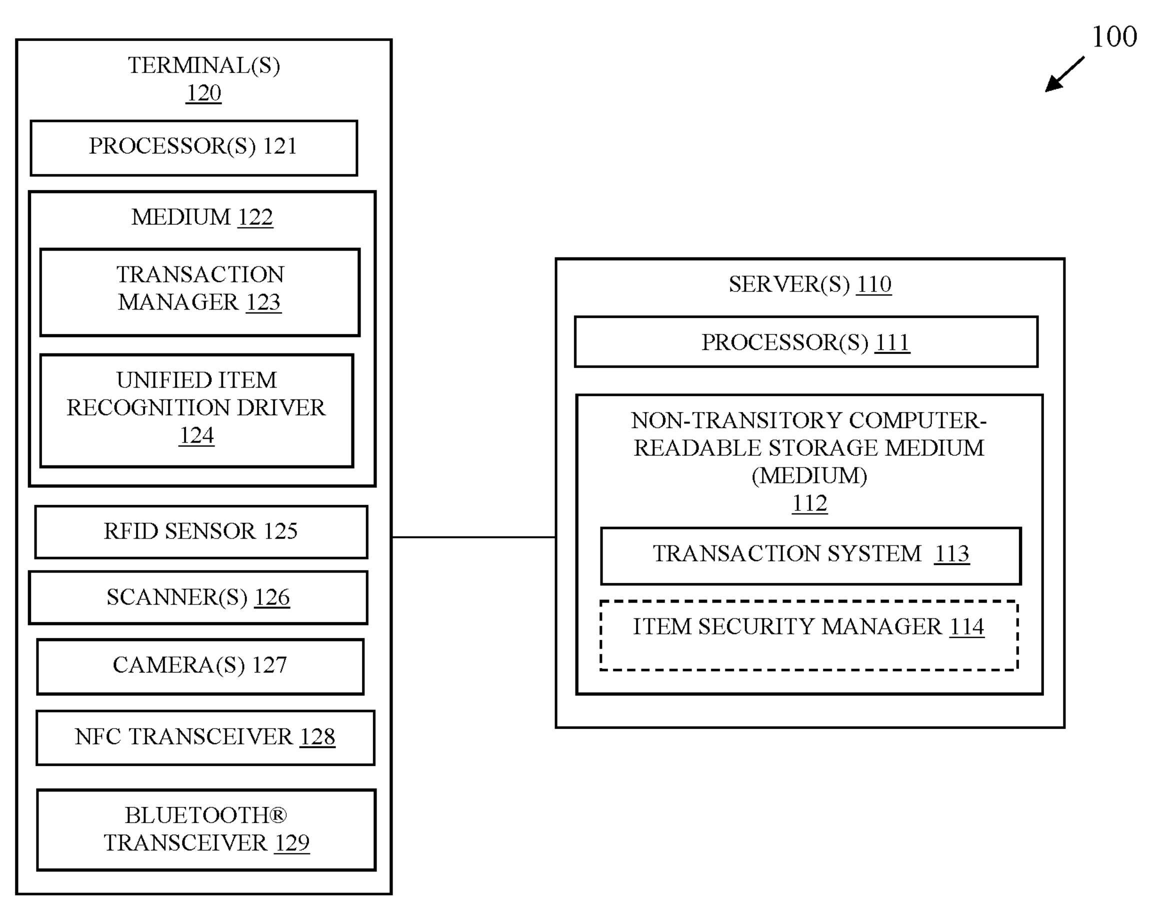
FIG. 1A is a diagram of a system for integrating disparate item scanning during checkouts, according to an example embodiment.

Self-checkouts support many optional peripheral attachments and applications for item scanning and item recognition. These include, among other things, radio frequency identification (RFID) readers, computer vision-based camera technology, barcode scanners, and cloud software services. All of these must work harmoniously to sell the correct items and item quantities. For each peripheral combination, front-end user interfaces (UIs) and backend systems (e.g., device controllers) may be provided to enable their operation and use in connection with transactions at self-service terminals (SSTs) and point-of-sale (POS) terminals. However, retailers provide or want to build their own front-end UI to represent their brand and customer experience. Currently, unified POS (UPOS) provides a single UI standard and interface to common peripheral devices of SSTs and POS terminals. A variety of UIs are derived from UPOS and are available in the industry such as OPOS® and JPOS®. A barcode scanner interface is described and provided by the UPOS standard and is used by most POS systems to interface with hardware to scan and sell items or products.

As will be described and presented herein and below, methods and a transaction terminal are provided, which permit integration of multiple disparate item scanning and item recognition techniques when items are being processed for checkouts at the terminal. Peripheral devices and software services are capable of being added in any combination (e.g., RFID reader plus flatbed scanner, etc.), but where the combination is presented to the terminal as a unified barcode scanner.

A point of friction with barcode scanners and computer vision item recognition is when items are unknown to the terminal or POS system of the terminal. Often, a similar item is sold to address the issue (e.g., item substitution). In order to minimize errors shown to the customer, cloud services and artificial intelligence (AI) are leveraged before showing any errors to the customer. If an unknown item is sold as a substitute, a picture is taken with available cameras and added to a report for the store manager so that inventory can be corrected, and any unknown item added to the POS system. Any substitution may be confirmed by the user via a popup window having an optional web accessible UI produced by the item selling software module(s). Resolving conflicts between item selling technologies is another technical solution provided by the teachings herein.

While RFID, flatbed scanner, and computer vision inputs are doing similar things for item recognition, there are cases where they see different items and do not agree on what the corresponding item codes should be. The teachings herein prioritize or rank the inputs and maintain time windows to provide a comprehensive conflict resolution system. For example, in example use cases, RFID reading is the most accurate item recognizer, computer vision is the next most accurate, and item barcode scanners are the third most accurate. As a result, in accordance with example embodiments of the technology disclosed herein, if an RFID reader identifies an RFID tag, the item code for the item is added to a table, if computer vision also identifies the item add the item code to the table, and if an item barcode scanner identifies the item add the item code to the table. Each sensor or peripheral has a list of item barcodes in a separate table, the tables are then compared based on confidence values to select the item codes with the highest confidence values. Depending on angles of a barcode, the scanner can identify an item, and if this is not in the computer-vision or RFID list or table, the item code for the item is processed at the terminal and sold to a customer during a transaction.

Similar to an electrical circuit, the teachings provide a setup time that allows each peripheral device of the terminal to stabilize. For example, if an RFID reader registers first, an item barcode scanner second, and computer vision third, each is allowed to take the needed time to process the items appearing on a tray of the terminal. Because not all items in a store are likely to have RFID tags, the RFID sensor cannot be exclusively relied upon. When an RFID sensor trips, computer vision is given enough time to confirm the items identified from the RFID tags read. The same is true for other sensors, each sensor is given enough time to report in on what is being sold.

Computer vision is initiated when hand motion for an operator of the terminal stops. As a result, computer vision's setup time begins timing when motion stops. The computer vision sends a message to the terminal indicating it has started processing the items.

Additionally, most convention scanners beep and/or flash when an item is scanned at a terminal. The teachings herein programmatically alert these notifications.

Most retailers use POS systems that adhere to a UPOS standard for device control. The teachings provided herein and below provide a universal software module or universal peripheral device driver that consolidates complex and disparate item recognition and scanning peripheral devices to provide item code outputs to the terminal. This allows the retailers to own the POS front end while also quickly incorporating and seamlessly integrating the latest item recognition and item selling peripheral devices and software without modifying the source code for their front end UIs on their terminals.

As used herein an "operator" refers to a customer or a cashier. This is the individual that is operating the terminal during a checkout for a transaction of the customer. The terminal can include a self-service terminal (SST) for self-checkouts or a point-of-sale (POS) terminal for cashier-assisted checkouts. As used herein an "item code" includes a barcoded item or a product lookup (PLU) code associated with a non-barcoded item.

FIG. 1A is a diagram of a system 100 for integrating disparate item scanning during checkouts, according to an example embodiment. Notably, the components are shown schematically in simplified form, with only those components relevant to understanding of the embodiments being illustrated.

Furthermore, the various components (that are identified in system 100) are illustrated and the arrangement of the components are presented for purposes of illustration only. Notably, other arrangements with more or less components are possible without departing from the teachings of integrating disparate item scanning during checkouts, presented herein and below.

System 100 includes a cloud/server 110 (hereinafter just "cloud 110") and one or more terminals 120. Cloud 110 includes at least one processor 111 and a non-transitory computer-readable storage medium (hereinafter just "medium") 112, which includes instructions for a transaction system 113, and, optionally, an item security manager 114. The instructions when provided to and executed by processor 111 cause processor 111 to perform the processing or operations discussed herein and below with respect to 113-116.

Each terminal 120 includes at least one processor 121 and a medium 122, which includes instructions for a transaction manager 123 and a unified item recognition driver. The instructions when provided to and executed by processor 121 cause processor 121 to perform the processing or operations discussed herein and below with respect to transaction manager 123 and unified item recognition driver 124. The terminal 120 also includes one or more of an RFID sensor 125, scanner(s) 126, camera(s) 127, a near filed communication (NFC) transceiver 128, and a Bluetooth® transceiver.

Unified item recognition driver 124 is configured to present RFID sensor 126, scanner(s) 126, camera(s) 127 used for computer vision item recognition, NFC transceiver 128, and Bluetooth® transceiver 129 as item barcode scanner peripheral devices to transaction manager 123 during transactions at a terminal 120. That is, the existing OPOS® or JPOS® relied upon by source code of an existing front end UI for transaction manager 123 does not have to be changed or modified in any manner to achieve the disparate peripheral device integration presented herein. This is because the unified item recognition driver 124 communicates item codes and item recognition information utilizing the UPOS standard and provides the item codes and recognition information as if the output were being provided by an item barcode scanner.

Figure 1B:
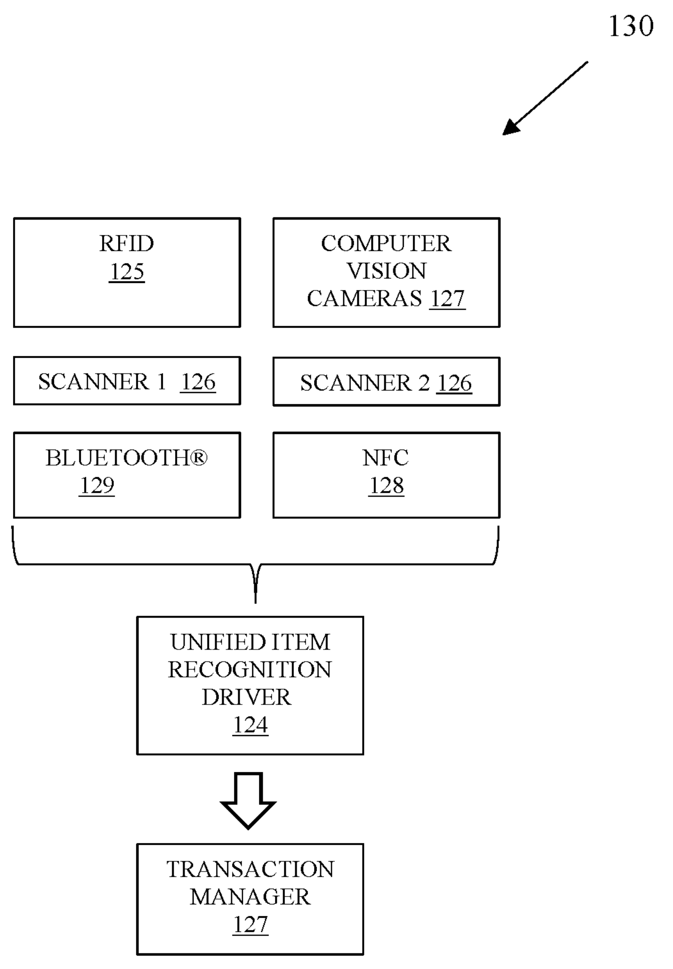
FIG. 1B is a diagram of an architecture for integrating disparate item scanning during checkouts, according to an example embodiment.

FIG. 1B is a diagram of an architecture 130 for integrating disparate item scanning during checkouts, according to an example embodiment. Unified item recognition driver 124 manages connections to and any interactions with RFID sensor 125, computer vision cameras 127, scanners 126, Bluetooth® transceiver 129, and NCF transceiver 128. Unified item recognition driver 124 processes an algorithm based on inputs received from peripherals 125-129 to provide an item code for an item being scanned at terminal 120 during a transaction. Unified item recognition driver 124 provides an outputted item code to the front end UI of transaction manager 127 utilizing the UPOS standard.

Figure 1C:
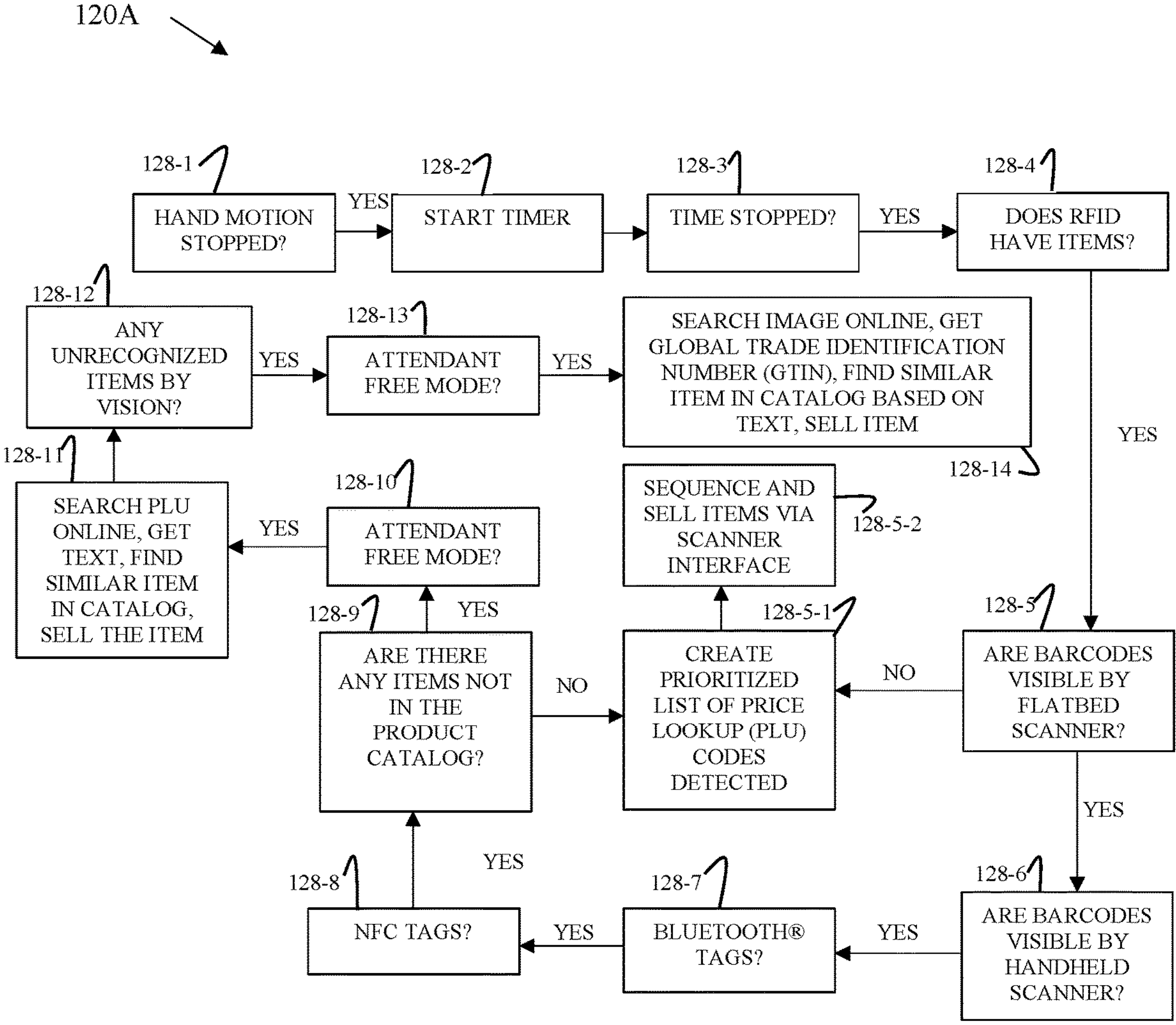
FIG. 1C is a flow diagram for a method of integrating disparate item scanning during checkouts, according to an embodiment.

In an embodiment, unified item recognition driver 124 processes an algorithm illustrated in FIG. 1C. FIG. 1C is a flow diagram for a method 120A of integrating disparate item scanning during checkouts, according to an embodiment.

At least one computer vision application monitors images provided by a camera 127. In an embodiment, a scanner 126 includes an embedded camera that provides images to the computer vision applications. The computer vision application looks for an item passing within the field of view of the camera 127 and a hand of an operator of the terminal 120. When the computer vision application detects the presence of the hand is no longer viewable from the images indicating that hand motion for an item being scanned as stopped, at 128-1, unified item recognition driver 124 starts a timer at 128-2.

The timer is set for a preconfigured amount of time necessary for the computer vision application to determine if the item associated with the hand motion can or cannot be identified as an item code sold by the retailer associated with the terminal 120. Since the computer vision application requires the most amount of time to perform item recognition for an item depicted in one or more images relative to an RFID tag reported by RFID sensor 125, an NCF tag reported by NCF transceiver 128, an item barcode reported by scanner 126, and a wireless tag reported by Bluetooth transceiver 129, the preconfigured amount of time is dictated by the length of time necessary for computer vision application to determine if an item can or cannot be identified during a transaction.

Once the time expires, unified item recognition driver 124 checks at 128-4 to determined if any RFID tag was reported by RFID sensor 125. At 128-5, unified item recognition driver 124 checks to see if an item barcode was received by a flatbed scanner 126. At 128-6, unified item recognition driver 124 checks to see if an item barcode was received by a handheld scanner 126. At 128-7, unified item recognition driver 124 checks to see if a wireless Bluetooth® tag was reported by Bluetooth® transceiver 129. At 128-8, unified item recognition driver 124 checks to see if an NFC tag was reported by NFC transceiver 128. At 128-9, unified item recognition driver 124 checks to see whether any tag or barcode obtained for the item is in a product catalog for the retailer associated with the terminal 120 or not. Assuming the item is in the product catalog, at 128-9 or assuming for 128-5 that the flatbed scanner did not see any barcode, at 128-5-1, unified item recognition driver 124 creates a prioritized list of price lookup (PLU) codes detected for produce items or non-barcoded items. At 128-5-2, the unified item recognition driver 124 sequences and sells the items via its scanner interface and transaction manager 123.

When the items are not detected in the product catalog, at 128-10, the unified item recognition driver 124 checks to see if the terminal is in attendant fee mode. This means there is a self-service transaction being performed by a customer at the terminal 120, which is an SST. If the terminal 120 is an attendant mode, the attendant can handle resolving the item codes for the transaction. When the terminal is in attendant free mode, at 128-11, the unified item recognition driver 124 searches for PLU codes, gets the relevant text from the search results, and finds a similar item in the product catalog. The PLU code is passed to transaction manager 123 and sold at the terminal. If there are any unrecognized items for the transaction detected at 128-12, the unified item recognition driver 124 checks to see if the terminal 120 is in attendant free mode at 128-13. Assuming the transaction is a self-service transaction, at 128-14, the unified item recognition driver 124 searches images of the item online, gets a global trade identification number (GTIN), finds a similar item in the product catalog and relevant text for the item, passes the text and item code to transaction manager 123, and sells the item.

Unified item recognition driver 124 ensures that all possible checks are made to resolve recognition of an item presented during a checkout. This includes polling a variety of peripheral devices 125-128 and computer vision applications. This also includes checking the product catalog for the retailer and searching online. Thus, the likelihood of an item going unrecognized during a checkout is substantially reduced from that which is currently the case with conventional item scanning and item recognition techniques.

The unified item recognition driver 124 also relies on a prioritization of item recognition. For example, when an RFID tag is present on an item and reported by the RFID sensor 125, the unified item recognition driver 124 uses that item code represented in the RFID tag and reports that item code to the transaction manager 123. When the computer vision application has a confidence level about a threshold, the item code identified by the computer vision application takes precedence over any item barcode scanner 126 reported bar code. Thus, the unified item recognition driver 124 uses a ranked and prioritized list of item codes from the peripherals 125-128 and computer vision applications when a given item has conflicting item codes reported and the unified item recognition driver 124 selects the item code based on the rankings and priorities.

Both barcoded items and non-barcoded items, such as produce items, are identified during the checkout. The item codes are reported from the unified item recognition driver 124 to the transaction manager 123. The transaction manager 123 manages the transaction and completes the transaction in cooperation with transaction system 113.

In an embodiment, any reported item code for a given item of the transaction, is further evaluated by item security manager 114 for item barcode switching and or miss scanned item events. When a security event is raised, item security manager 114 instructs transaction manager 123 to suspend the transaction for an audit of the item(s) causing the security event.

In an embodiment, the scanners 126 includes a flatbed scanner, a handheld scanner, or a bioptic scanner. In an embodiment, the scanner 126 includes an integrated weigh scale for providing a weight of an item, such as produce items associated with a PLU code. When the item is non-barcoded, the unified item recognition driver 124 provides the PLU code to transaction manager 123 and transaction manager 123 obtains a weight for the item from the weight scale to calculate a price for the item during the transaction.

Figure 2:
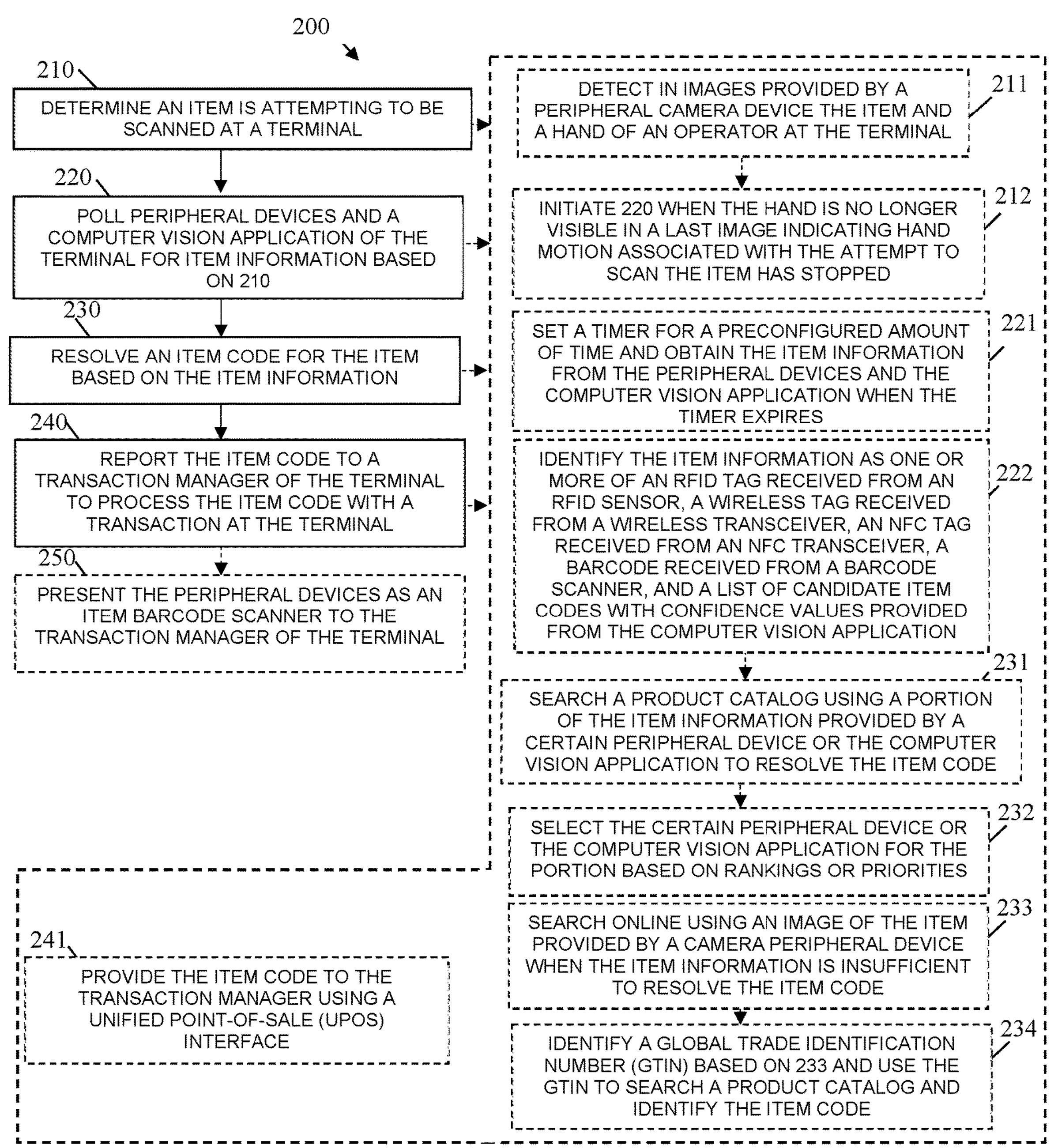
FIG. 2 is a flow diagram of another method for integrating disparate item scanning during checkouts, according to an example embodiment.

The above-referenced embodiments and other embodiments are now discussed with reference to FIGS. 2 and 3. FIG. 2 is a flow diagram of a method 200 for integrating disparate item scanning during checkouts, according to an example embodiment. The software module(s) that implements the method 200 is referred to as a "unified item recognition driver." The unified item recognition driver is implemented as executable instructions programmed and residing within memory and/or a non-transitory computer-readable (processor-readable) storage medium and executed by one or more processors of one or more devices. The processor(s) of the device(s) that executes the item unified item recognition driver are specifically configured and programmed to process unified item recognition driver. The unified item recognition driver may have access to one or more network connections during its processing. The network connections can be wired, wireless, or a combination of wired and wireless.

In an embodiment, the device that executes the unified item recognition driver is terminal 120. In an embodiment, the device that executes the unified item recognition driver is cloud or server 110. In an embodiment, the unified item recognition driver is unified item recognition driver 124 and/or method 120A.

At 210, the unified item recognition driver determines an item is attempting to be scanned at a terminal 120. In an embodiment, at 211, the unified item recognition driver detects in images provided by a peripheral camera device 127 the item and a hand of an operator at the terminal 120. In an embodiment of 211 and at 212, the unified item recognition driver initiates 220 when the hand is no longer visible or detectable in a last image indicating that hand motion associated with the attempted to scan the item has stopped.

At 220, the unified item recognition driver polls peripheral devices 125-129 and a computer vision application of the terminal 120 for item information based on 210. The item information, includes by way of example only, an RFID tag, an NFC tag, a wireless tag such as a Bluetooth® tag, a GTIN, the item code itself for the item, image features for the item, a barcode, etc.

In an embodiment, at 221, the unified item recognition driver sets a timer for a preconfigured amount of time and obtains the item information from the peripheral devices 125-129 and the computer vision application when the timer expires. In an embodiment, the preconfigured amount of time is the expected elapsed time taken by the computer vision application to provide its corresponding item information.

In an embodiment, at 222, the unified item recognition driver identifies the item information as one or more of an RFID tag received from an RFID sensor 125, a wireless tag received from a wireless transceiver 129, an NFC tag received from an NFC transceiver 128, a barcode received from a barcode scanner 126, and a list of candidate item codes with confidence values provided from the computer vision application. Any combination of two or more of the types of item information and corresponding supporting peripheral devices 125-129 can be present.

At 230, the unified item recognition driver resolves an item code for the item based on the item information. In an embodiment of 222 and 230, at 231, the unified item recognition driver searches a product catalog using a portion of the item information provided by a certain peripheral device or the computer vision application to resolve the item code. In an embodiment of 231 and at 232, the unified item recognition driver selects the certain peripheral device or the computer vision application for the portion of the information based on rankings or priorities maintained for the peripheral devices 125-129 and the computer vision application.

In an embodiment, at 233, the unified item recognition driver searches online using an image of the item provided by a camera peripheral device 127 when the item information is insufficient to resolve the item code. In an embodiment of 233 and at 234, the unified item recognition driver identifies a GTIN based on the search of 233 and uses the GTIN to search a product catalog and identify the item code.

At 240, the unified item recognition driver reports the item code to a transaction manager 123 of the terminal 120 to process the item code with a transaction at the terminal 120. In an embodiment, at 241, the unified item recognition driver provides the item code to the transaction manager 123 using a UPOS interface standard.

Figure 3:
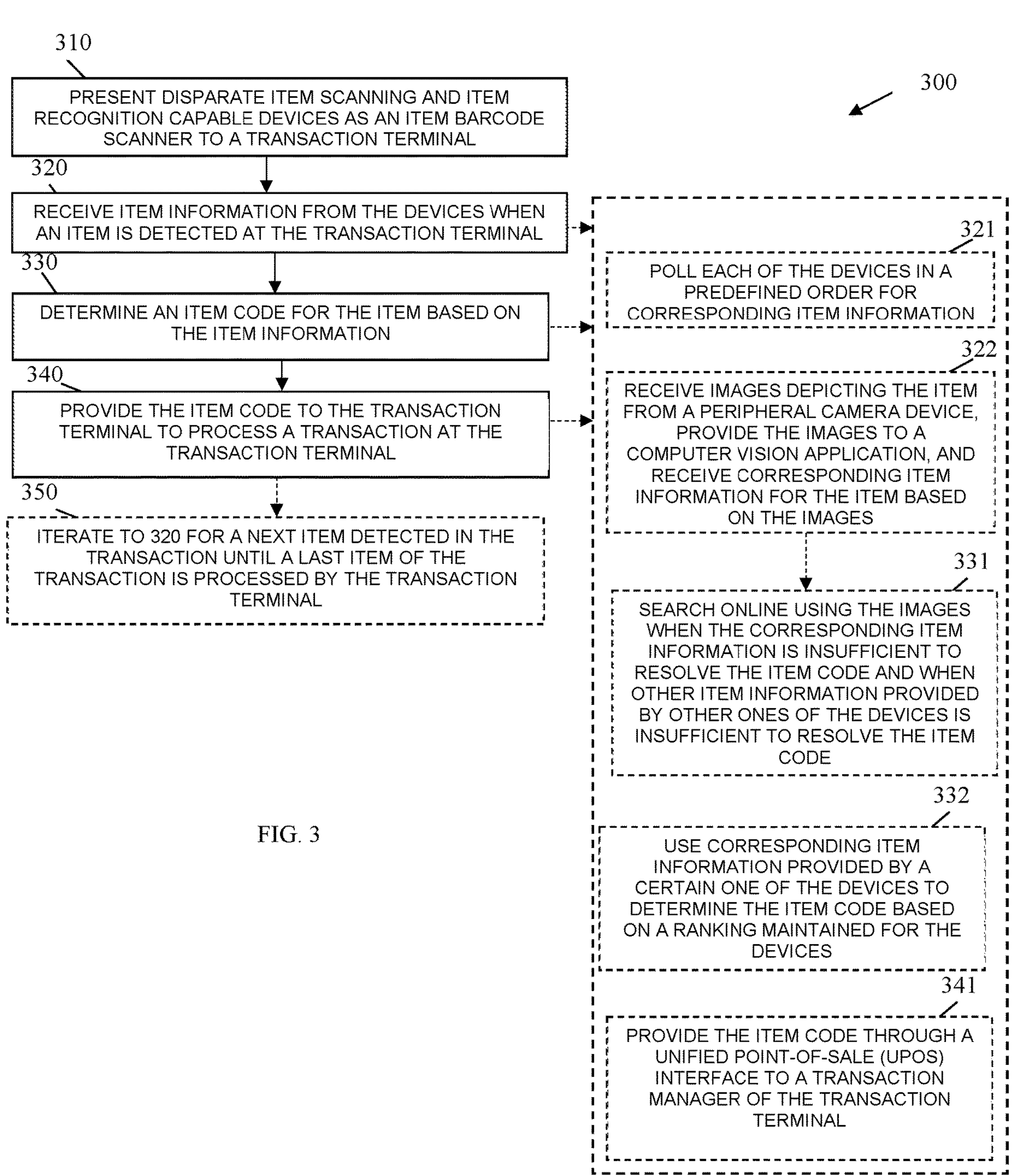
FIG. 3 is a flow diagram of yet another method for integrating disparate item scanning during checkouts t, according to an example embodiment.

FIG. 3 is a flow diagram of another method 300 for integrating disparate item scanning during checkouts, according to an example embodiment. The software module(s) that implements the method 300 is referred to as an “item recognizer.” The item recognizer is implemented as executable instructions programmed and residing within memory and/or a non-transitory computer-readable (processor-readable) storage medium and executed by one or more processors of one or more device(s). The processors that execute the item recognizer are specifically configured and programmed for processing the item recognizer. The item recognizer may have access to one or more network connections during its processing. The network connections can be wired, wireless, or a combination of wired and wireless.

In an embodiment, the device that executes item recognizer is terminal 120. In an embodiment, terminal 120 is an SST or a POS terminal. In an embodiment, the device that executes the transaction item recognizer is cloud or server 110. In an embodiment, the item recognizer is transaction unified item recognition driver 124, method 120A, and/or method 200. The item recognizer presents another and, in some ways, enhanced processing perspective from that which was discussed above for system 100, method 120A, and method 200.

At 310, the item recognizer presents disparate item scanning and item recognition capable devices 125-129 as an item barcode scanner to a transaction terminal 120. At 320, the item recognizer receives item information from the devices 125-129 when an item is detected at the transaction terminal 120.

In an embodiment, at 321, the item recognizer polls each of the devices 125-129 in a predefined order for corresponding item information about the item. In an embodiment at 322, the item recognizer receives images depicting the item from a peripheral camera device 127 and the item recognizer provides the images to a computer vision application. The item recognizer receives corresponding item information for the item from the computer vision application based on the images.

At 330, the item recognizer determines an item code for the item based on the item information. In an embodiment of 322 and 330, at 331, the item recognizer searches online using the images when the corresponding item information is insufficient to resolve the item code and when other item information provided by other ones of the devices 125-129 is insufficient to resolve the item code. In an embodiment, at 332, the item recognizer uses corresponding item information provided by a certain one of the devices to determine the item code based on a ranking maintained for the devices 125-129.

At 340, the item recognizer provides the item code to the transaction terminal 120 to process a transaction at the transaction terminal 120. In an embodiment, at 341, the item recognizer provides the item code through a UPOS interface to a transaction manager 123 of the transaction terminal 120.

In an embodiment, at 350, the item recognizer iterates to 320 for a next item detected in the transaction. This iteration continues until a last item of the transaction is processed by the transaction terminal 120 for the transaction.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

detecting an attempted scan event of an item at a terminal;

polling a plurality of peripheral devices and at least one computer vision application of the terminal for item information associated with the item;

resolving an item code for the item based at least in part on the item information by prioritizing the item information from peripheral devices and the at least one computer vision application using a ranked and prioritized list when conflicting item codes are reported for the item and selecting the item code based on rankings maintained for the peripheral devices and the at least one computer vision application to provide a comprehensive conflict resolution system; and reporting the item code to a transaction manager of the terminal to process the item code in connection with a transaction at the terminal;

wherein the item code is reported to the transaction manager using a unified point-of-sale (UPOS) interface that presents the peripheral devices as an item barcode scanner to the transaction manager so that source code of an existing front-end user interface for the transaction manager does not have to be changed or modified to achieve integration of the peripheral devices.

2. The method of claim 1, wherein detecting further includes detecting in images provided by a peripheral camera device the item and a hand of an operator at the terminal.

3. The method of claim 2, wherein detecting further includes initiating polling when the hand is no longer visible in a last image indicating that hand motion associated with a corresponding attempt to scan the item has stopped.

4. The method of claim 1, wherein polling further includes setting a timer for a preconfigured amount of time and obtaining the item information from the peripheral devices and the at least one computer vision application when the timer expires.

5. The method of claim 1, wherein polling further includes identifying the item information as one or more of a radio frequency identification (RFID) tag received from an RFID sensor, a wireless tag received from a wireless transceiver, a near field communication (NFC) tag received from a NFC transceiver, a barcode received from a barcode scanner, and a list of candidate item codes with confidence values provided from the at least one computer vision application.

6. The method of claim 5, wherein resolving further includes searching a product catalog using a portion of the item information provided by a certain peripheral device or the at least one computer vision application to resolve the item code.

7. The method of claim 6, wherein searching further includes selecting the certain peripheral device or the at least one computer vision application for the portion of the item information based on rankings or priorities maintained for the peripheral devices and the at least one computer vision application.

8. The method of claim 1, wherein resolving further includes searching online using an image of the item provided by a camera peripheral device when the item information is insufficient to resolve the item code.

9. The method of claim 8, wherein searching further includes identifying a global trade identification number (GTIN) based on the searching and using the GTIN to search a product catalog to identify the item code.

10. The method of claim 1, wherein reporting further includes providing the item code to the transaction using the UPOS interface.

11. The method of claim 1 further comprising, presenting the peripheral devices as an item barcode scanner device to the transaction manager of the terminal.

12. A method, comprising:

presenting a plurality of disparate item scanning and item recognition capable devices (devices) as an item barcode scanner to a transaction terminal using a universal peripheral device driver that consolidates disparate item recognition of scanning peripheral devices to provide item code outputs to the transaction terminal;

wherein the universal peripheral device driver communicates item codes and item recognition information utilizing a unified point-of-sale (UPOS) standard and provides the item codes and recognition information as if the item code outputs were being provided by an item barcode scanner so that retailers own a point-of-sale front end while quickly incorporating and seamlessly integrating item recognition and item scanning peripheral devices without modifying source code for front-end user interfaces on the transaction terminal;

receiving item information from the devices when an item is detected at the transaction terminal;

determining an item code for the item based on the item information by using a ranked and prioritized list of item codes from the devices when conflicting item codes are reported for the item and selecting the item code based on rankings maintained for the devices; and providing the item code to the transaction terminal to process a transaction at the transaction terminal.

13. The method of claim 12, wherein receiving further includes polling each of the devices in a predefined order for corresponding item information.

14. The method of claim 12, wherein receiving further includes receiving images depicting the item from a peripheral camera device, providing the images to a computer vision application, and receiving corresponding item information for the item from the computer vision application based on the images.

15. The method of claim 14, wherein determining the item code further includes searching online using the images when the corresponding item information is insufficient to resolve the item code and when other item information provided by other ones of the devices is insufficient to resolve the item code.

16. The method of claim 12, wherein determining the item code further includes using corresponding item information provided by a certain one of the devices to determine the item code based on a ranking maintained for the devices.

17. The method of claim 12, wherein providing further includes providing the item code through the UPOS interface to a transaction manager of the transaction terminal.

18. The method of claim 12 further comprising, iterating to the receiving for a next item detected in the transaction until a last item of the transaction is processed by the transaction terminal.

19. A transaction terminal, comprising:

a processor and a non-transitory computer-readable storage medium;

the non-transitory computer-readable storage medium comprises executable instructions; and the executable instructions when executed on the processor cause the processor to perform operations comprising:

presenting a plurality of disparate item scanning and item recognition capable devices (devices) as an item barcode scanner to a transaction manager of the transaction terminal using a unified point-of-sale (UPOS) interface;

wherein a universal peripheral device driver consolidates disparate item recognition of scanning peripheral devices to provide item code outputs to the transaction terminal;

wherein the universal peripheral device driver communicates item codes and item recognition information utilizing a UPOS standard and provides the item codes and recognition information as if the item code outputs were being provided by an item barcode scanner so that source code of an existing front-end user interface for the transaction manager does not have to be changed or modified in any manner to achieve integration of the scanning peripheral devices;

detecting an item that is attempting to be scanned at the transaction terminal during a transaction using at least one of the devices;

polling the devices for item information associated with the item;

using certain item information provided by a certain one of the devices or provided by a computer vision application to resolve an item code for the item by using a ranked and prioritized list of item codes from the devices and computer vision application when conflicting item codes are reported for the item and selecting the item code based on rankings maintained for the devices and computer vision application; and providing the item code to the transaction manager through the UPOS interface to process the item with the transaction.

20. The transaction terminal of claim 19, wherein the devices comprise two or more of a flatbed scanner, a handheld scanner, a bioptic scanner, a radio frequency identification (RFID) sensor, a near field communication (NCF) transceiver, a wireless transceiver, and at least one computer vision camera.

* * * * *